United States Patent
Venturini et al.

(10) Patent No.: US 7,507,285 B2
(45) Date of Patent: Mar. 24, 2009

(54) ALUMINUM EFFECT PIGMENT BLENDS

(75) Inventors: Michael Venturini, Yorktown Heights, NY (US); Wei Liu, Glen Mills, PA (US); William Sullivan, Ossining, NY (US)

(73) Assignee: BASF Corporation, Florham Park, NJ (US)

( * ) Notice: Subject to any disclaimer, the term of this patent is extended or adjusted under 35 U.S.C. 154(b) by 154 days.

(21) Appl. No.: 11/124,655

(22) Filed: May 9, 2005

(65) Prior Publication Data

US 2005/0252416 A1    Nov. 17, 2005

Related U.S. Application Data

(60) Provisional application No. 60/569,940, filed on May 11, 2004.

(51) Int. Cl.
  C09C 1/64    (2006.01)
  C09C 1/00    (2006.01)
  C09D 11/00   (2006.01)

(52) U.S. Cl. .................. 106/404; 106/31.65; 106/31.9; 106/403; 524/404; 524/413; 524/424; 524/430; 524/434; 524/437; 524/439; 524/440; 524/441

(58) Field of Classification Search .............. 106/404, 106/31.65, 31.9, 403; 524/404, 413, 424, 524/430, 434, 437, 439, 440, 441
See application file for complete search history.

(56) References Cited

U.S. PATENT DOCUMENTS

| | | | |
|---|---|---|---|
| 2,278,970 A | 4/1942 | Atwood | 106/148 |
| 3,087,828 A | 4/1963 | Linton | 106/291 |
| 3,418,146 A | 12/1968 | Rieger et al. | 106/440 |
| 3,437,513 A | 4/1969 | Burlant et al. | 427/503 |
| 4,084,983 A | 4/1978 | Bernhard et al. | 106/289 |
| 4,725,317 A | 2/1988 | Wheeler | 106/290 |
| 4,755,229 A | 7/1988 | Armanini | 106/413 |
| 4,937,274 A | 6/1990 | Arima | 523/220 |
| 4,968,351 A | 11/1990 | Ahmed et al. | 106/402 |
| 5,217,928 A | 6/1993 | Goetz et al. | 501/33 |
| 5,277,711 A | 1/1994 | Schmidt et al. | 106/404 |
| 5,753,371 A | 5/1998 | Sullivan et al. | 428/406 |
| 5,759,255 A | 6/1998 | Venturini et al. | 106/418 |
| 6,045,914 A | 4/2000 | Sullivan et al. | 428/404 |
| 6,267,810 B1 | 7/2001 | Pfaff et al. | 106/415 |
| 6,306,931 B1 | 10/2001 | Ferguson | 523/161 |
| 6,331,326 B1 | 12/2001 | Tsunoda et al. | 427/202 |
| 6,398,861 B1 | 6/2002 | Knox | 106/404 |
| 6,436,538 B1 | 8/2002 | Takahashi et al. | 428/403 |
| 6,503,965 B1 | 1/2003 | Nowak et al. | 523/161 |

FOREIGN PATENT DOCUMENTS

EP    0 404 378 A    12/1990
EP    1 338 628 A    8/2003

OTHER PUBLICATIONS

L.M. Greenstein, "Nacreous (Pearlescent) Pigments and Interference Pigments", The Pigment Handbook, vol. I, Properties & Economics, 2nd Ed. John Wiley & Sons, Inc. (1988), no month.
PCT International Search Report for PCT/US 2005/016163 (Sep. 13, 2005).

*Primary Examiner*—Anthony J Green
(74) *Attorney, Agent, or Firm*—Bernard Lau

(57) ABSTRACT

The present invention provides a blend which exhibits enhanced hiding power and comprises (a) at least one effect pigment and (b) aluminum pigment. The present blend is advantageously used in automotive and industrial paint applications.

17 Claims, 6 Drawing Sheets

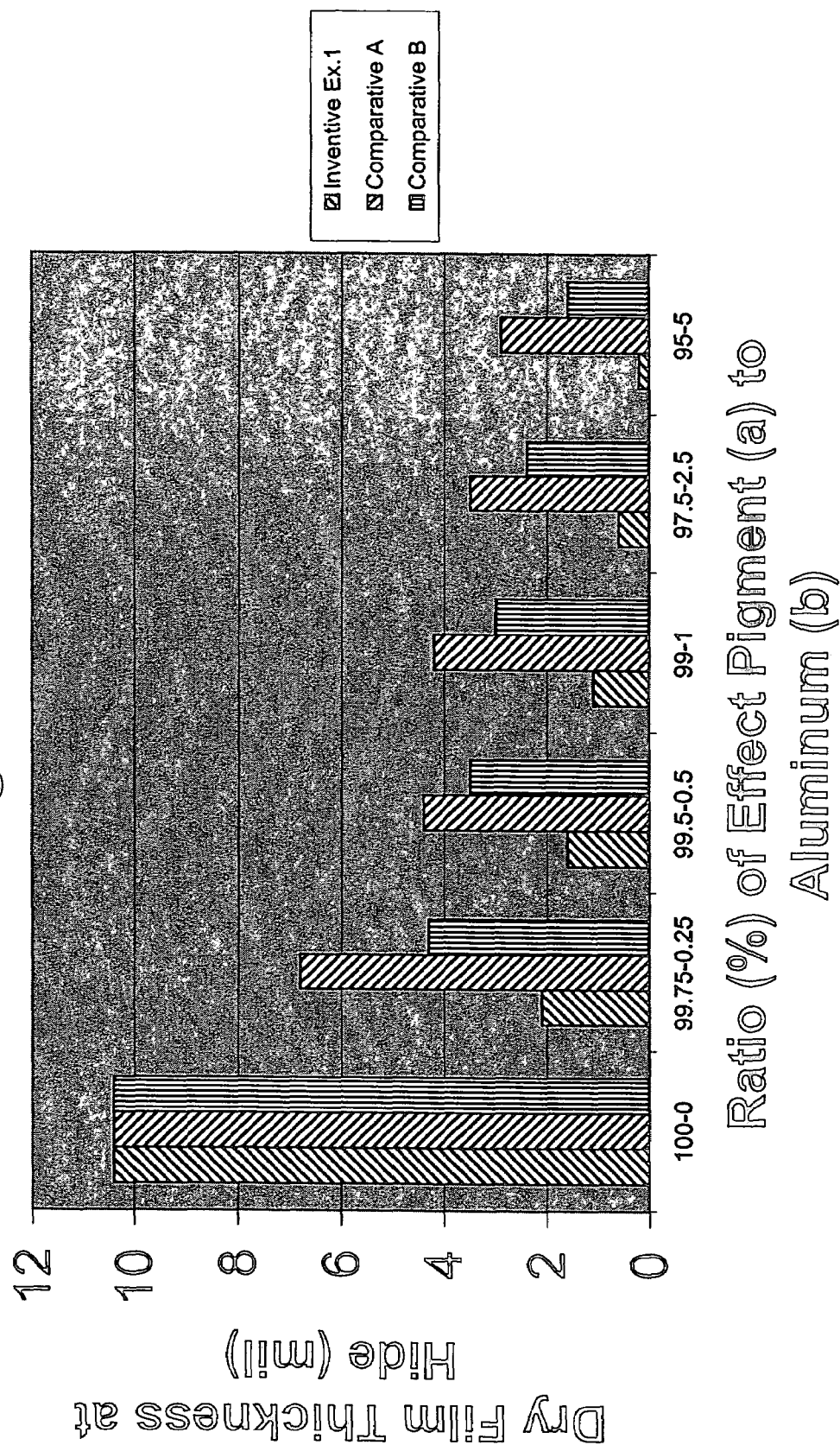

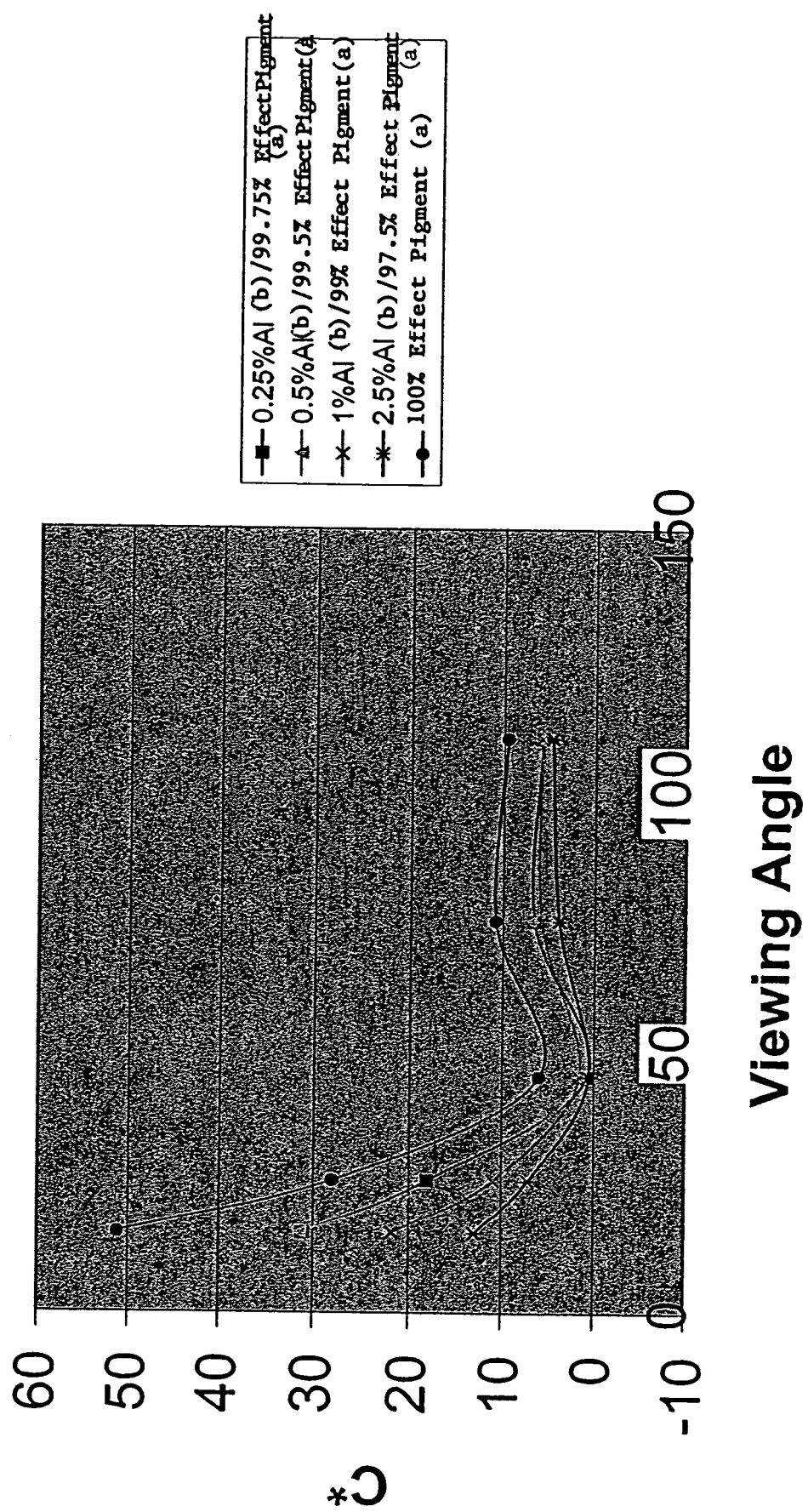
Figure 2 - Chroma

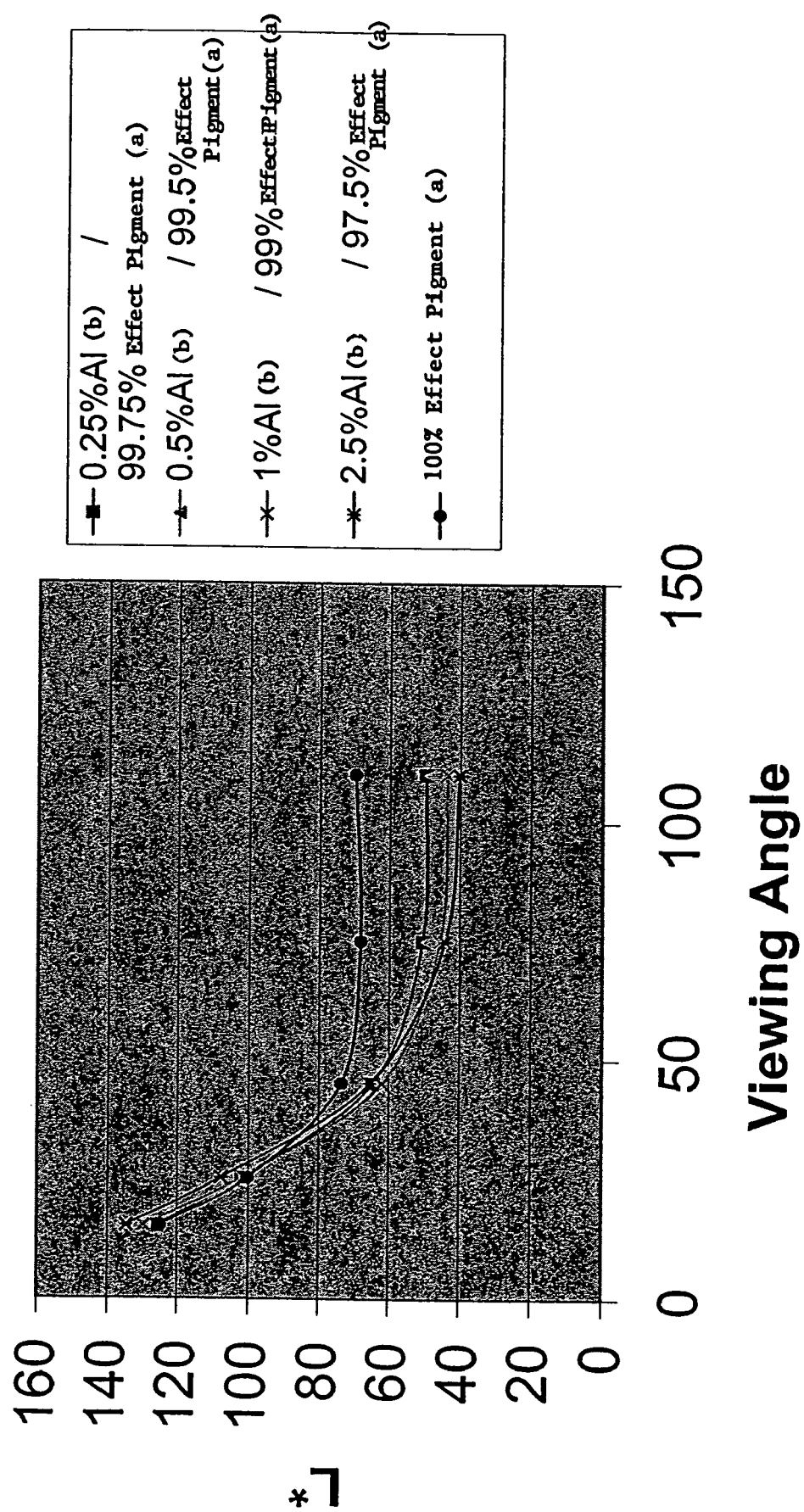

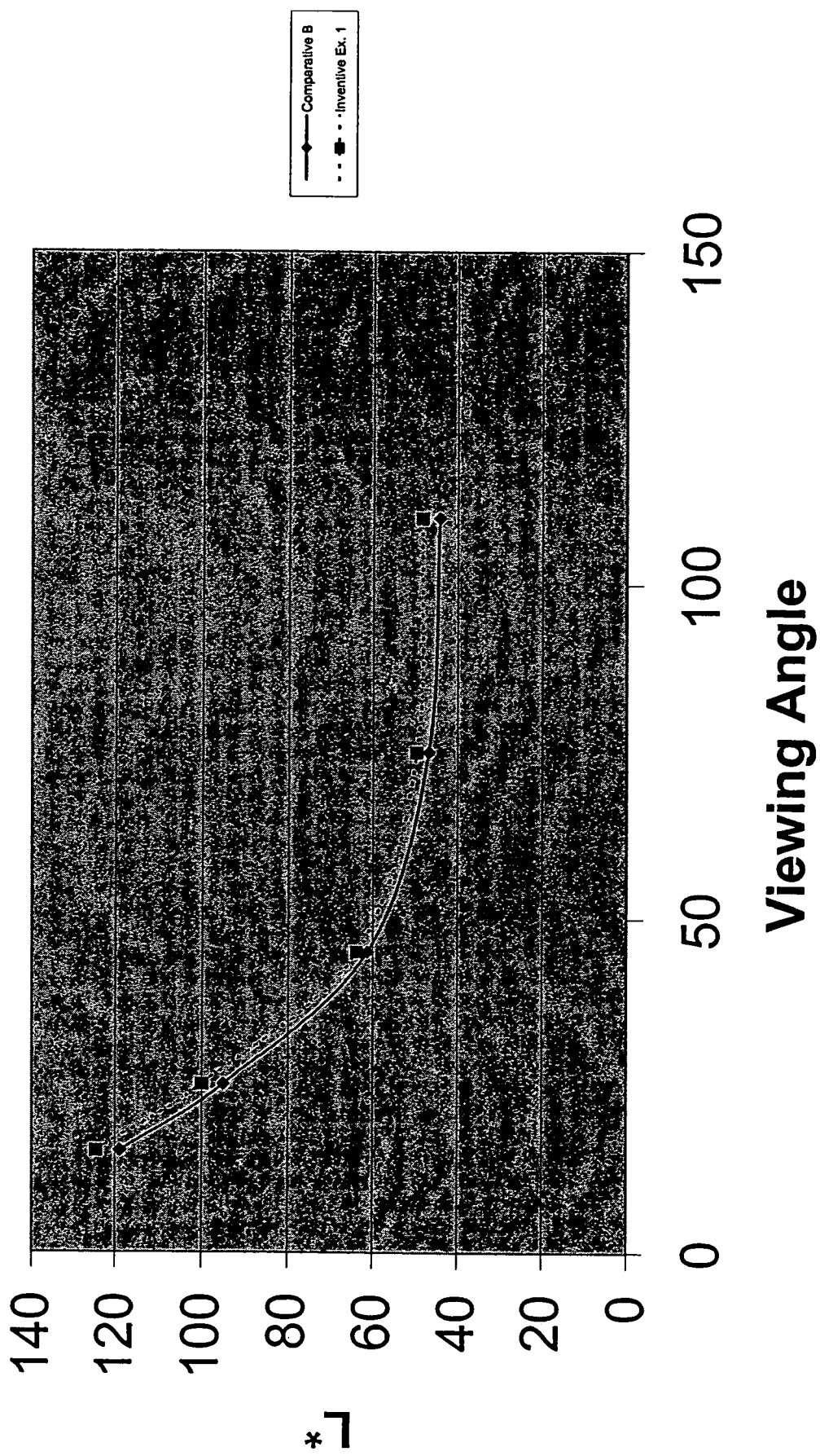

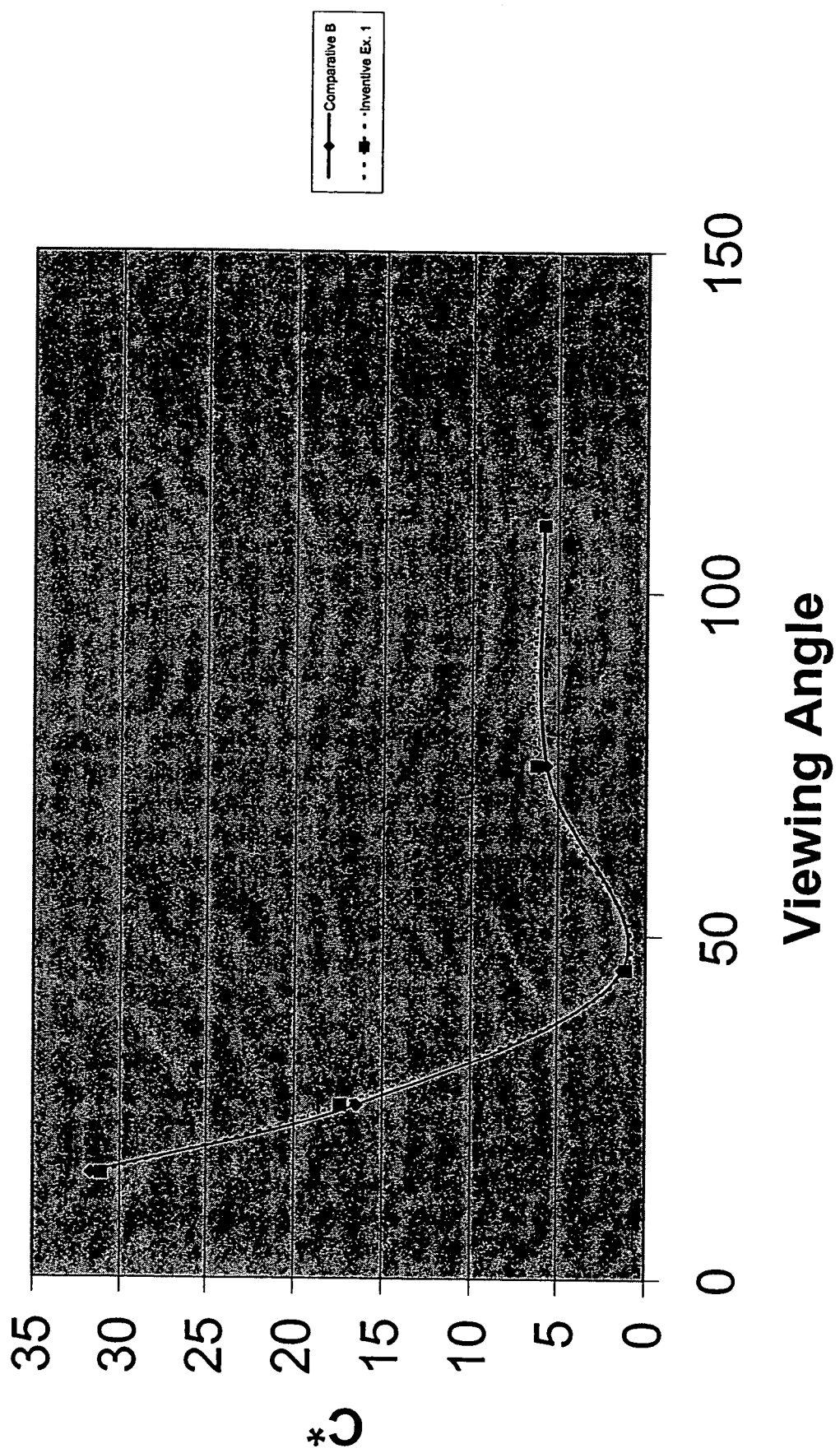

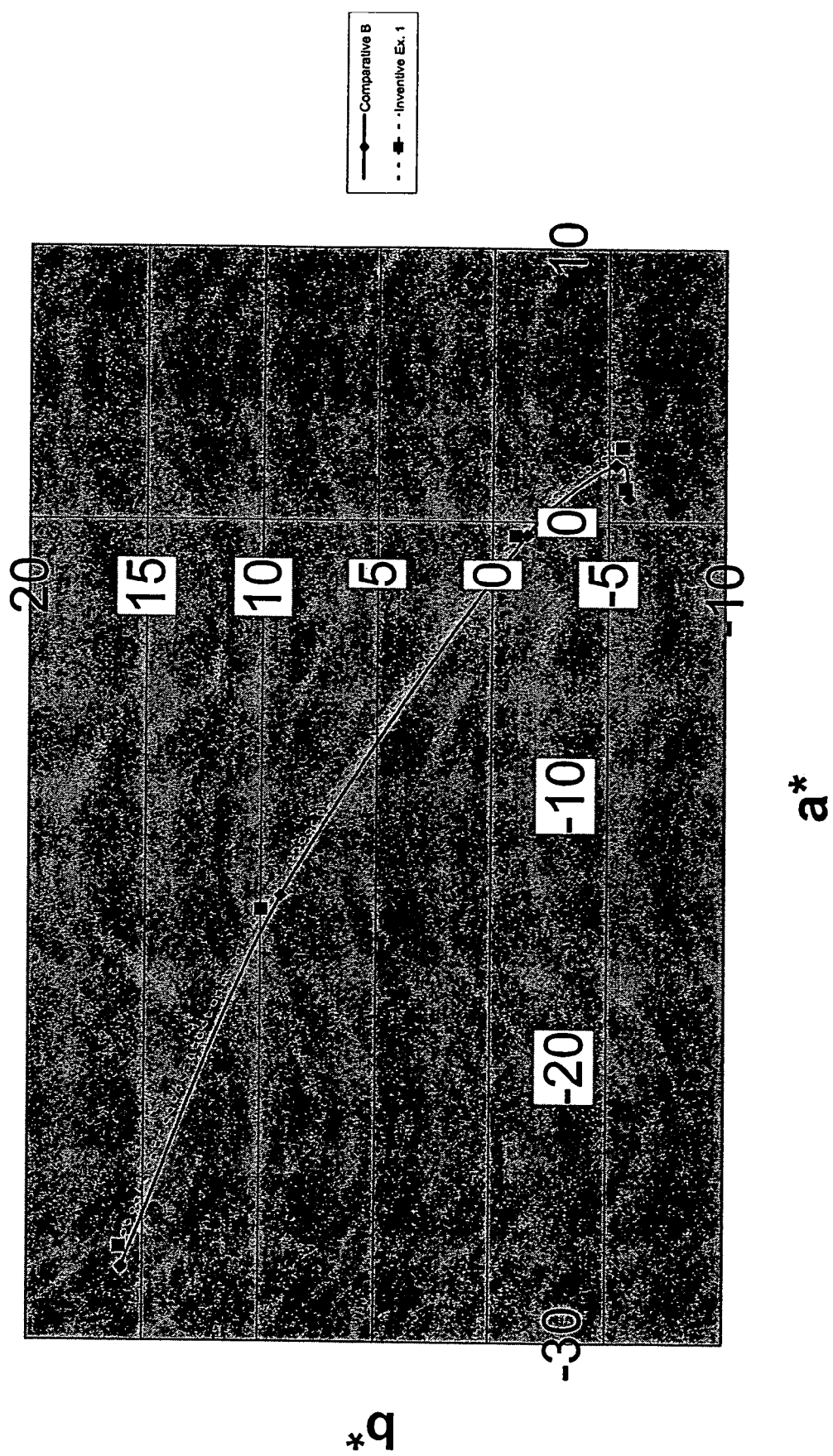

ALUMINUM EFFECT PIGMENT BLENDS

This application claims priority from U.S. Provisional Application No. 60/569,940 filed May 11, 2004.

BACKGROUND OF THE INVENTION

Effect pigments, also known as nacreous pigments and pearlescent pigments, are lustrous specialty chemical products that are widely used in a variety of high-end applications such as automotive finishes. Effect pigments simulate pearly luster or have effects that range from silky sheen to metallic luster as disclosed in L. M. Greenstein, "Nacreous (Pearlescent) Pigments and Interference Pigments", *The Pigment Handbook*, Volume 1, Properties & Economics, Second Edition, Edited by Peter A. Lewis, John Wiley & Sons, Inc. (1988). One of the attributes of the effect pigments is that they can generate a range of optical effects depending on the angle at which they are viewed.

Pearlescent or nacreous pigments simulate the effect of natural pearl and are composed of thin platelets which are transparent in the visible region of the spectrum. The platelets are very smooth and part of the light which strikes the platelets is reflected and part is transmitted through the platelets. That part of the light that is transmitted is subsequently reflected by other layers of platelets. The result is that multiple reflections from many layers occur and this results in depth of sheen since the eye cannot focus on one particular layer.

The reflection that occurs is specular in that the angle of incidence equals the angle of reflection. The amount of light reflected at non-specular angles is small and the amount of light reflected diminishes very quickly as the specular angle is passed. The result is that pearlescent pigments are extremely sensitive to viewing angle. In order for the maximum amount of light to be reflected, the platelets must be extremely smooth. Any surface roughness causes light to be scattered in a non-specular manner and diminishes the lustrous effect.

The platelets must be aligned parallel to each other and to the substrate for maximum reflectivity. If not so aligned, light will be reflected randomly and again, luster will diminish. The amount of light that is reflected depends on the index of refraction. As the index of refraction increases, the amount of reflected light increases.

However, in a number of applications, the effect materials have a lesser degree of hiding power than desired. To remedy this problem, a variety of materials have been incorporated in effect pigment formulations.

Effect pigments are often based on platelet shaped particles. Because the optical effect is the result of multiple reflections and transmission of light, it is desirable to provide particles that will align in the medium in which they are found and to optimize the desired effect. The presence of either misaligned particles or particles of an additive, or both, interferes with this objective and diminishes the optical effect of the pigment. It is therefore generally considered to be desirable for any additive being used for increased hiding to be somehow bound to the platelets rather than present as part of a physical mixture.

Effect pigments, particularly pigments based on mica, have long been used in automotive top coats in order to achieve a colored metallic effect, among other reasons. That metallic effect can be characterized by the flip-flop of light to dark as the viewing angle is changed. In the case of mica pigments, that flip-flop is from the reflection color of the mica to dark. Most automotive top coats are required to be opaque to ultraviolet light and also to visible light when applied at a conventional thickness of about 0.5 to 1.2 mils (about 12.7-30.5 µm) for a variety of reasons. It has been a challenge to maintain the "face" or reflection color which is contributed by the mica pigment while at the same time developing hiding in that it is known that opaque pigments greatly reduce the color/effect of the mica pigments.

Metallic flake pigments such as aluminum are opaque to light, i.e., no light is transmitted. Because of the preceding property, metallic flake pigments cover well and thus, the substrate over which they are coated can be completed hidden. This property is known as hiding power.

Blends of aluminum metal pigments with mica pigments (such as $TiO_2$-coated mica pigment) are well known. For instance, U.S. Pat. No. 6,503,965 teaches an ink which can contain a non-fluorescent pigment alone or a mixture of two or more non-fluorescent pigments which can be selected from a long list of such pigments, including aluminum flake pigments (with thickness ranging from about 0.1 to about 2 microns) and $TiO_2$- and $Fe_2O_3$-coated mica pigments. U.S. Pat. No. 2,278,970 teaches that thin mica flakes are suitable for use as an inert filler in combination with aluminum flake pigment to extend the covering quality of the latter. U.S. Pat. No. 6,331,326 teaches coating a primer and/or a first metallic paint containing a non-leafing type aluminum flake, and then applying a second metallic paint containing small thin flakes. The primer can be blended with a flat pigment, such as the thin aluminum flakes as well as flaky mica, to increase hiding power or hiding sand scratches on the substrate.

U.S. Pat. No. 6,306,931 teaches the use of preferred aluminum flake pigments that have median particle size of about 100 microns or less or especially 10 microns or less for incorporation into a coating. U.S. Pat. No. 6,398,861 teaches the use of an aluminum flake pigment having a diameter range of 6 microns to 600 microns for coatings.

Silberline.com advertises that its vacuum metallized aluminum flake can be used in cosmetics to achieve a smooth, mirror-like metallic effect and to deliver highly reflective, brilliant finishes.

Blends of aluminum with non-effect materials are also known. For example, U.S. Pat. No. 4,937,274 teaches mixing aluminum flake pigments with ultrafine materials such as titanium dioxide. This coating composition does not include any interference (effect) mica pigments but is said to be still capable of providing an effect like those coatings containing the interference mica pigments and aluminum flake.

U.S. Pat. No. 6,267,810 teaches the use of a pigment comprising 15 grams of Cromal IV (Eckart) Al 14-18 microns and 15 grams of $Fe_2O_3$-coated $Al_2O_3$ flakes of particle size 5-60 microns in a printing ink in Example 2. No mention is made as to the effect, if any, provided by this pigment.

On May 11, 2004, Eckart (see eckartamerica.com) reported that METALURE® pigments are microscopically thin aluminum platelets manufactured in a physical vapor deposition process to provide pigments with uniform thickness and homogeneous smooth surface. The average particle size range was 10-13 microns. On May 11, 2004, it was reported that Eckart's METALURE® ultra brilliant aluminum dispersion when mixed with pearlescent provides polychromatic effects. The article is silent on the thickness of the aluminum pigment or the percentage of aluminum pigment used in combination with pearlescent (see cosmetics.com).

The provision of new high hiding power compositions is still desired and it is the object of the present invention is to provide such compositions. This and other objects of the invention will become apparent to those skilled in this art from the following detailed description.

SUMMARY OF THE INVENTION

This invention relates to an effect pigment composition which exhibits enhanced hiding power. More particularly, the invention relates to an effect pigment composition which exhibits enhanced hiding power containing effect pigment and aluminum pigment. This invention also provides compositions using such formulations as a pigment. The improved hiding power is achieved while maintaining the face color of the effect pigment. Thus, the present invention provides a blend comprising: (a) at least one effect pigment; and (b) about 0.01 to about 5 weight percent based on the total weight of the blend of an aluminum metal pigment having a mirror-like appearance.

BRIEF DESCRIPTION OF THE DRAWINGS

FIG. 1 illustrates the hiding power of Comparatives A and B and Inventive Example 1.

FIG. 2 illustrates the chroma for Inventive Example 1.

FIG. 3 illustrates the brightness for Inventive Example 1.

FIG. 4 illustrates the brightness of the same dry film thickness at hide for Comparative B and Inventive Example 1.

FIG. 5 illustrates the color intensity of the same dry film thickness at hide for Comparative B and Inventive Example 1.

FIG. 6 illustrates the color travel of the same dry film thickness at hide for Comparative B and Inventive Example 1.

DESCRIPTION OF THE INVENTION

The present invention exhibits enhanced hiding power and comprises: (a) at least one effect pigment and (b) aluminum pigment.

Effect Pigment (a):

The effect pigments which may be employed in the present invention may be any known effect pigment, preferably based on mica, which is optionally coated with a wide variety of inorganic coloring agents. The different materials or substrates used in the present invention may have any morphology including platelet, spherical, cubical, acicular, whiskers, or fibrous. A mixture of different substrate materials or different substrate morphologies or both may be used in the present invention. Examples of useful platy materials include platy aluminum oxide, platy glass, platy titanium dioxide, aluminum, mica, bismuth oxychloride, platy iron oxide, platy graphite, platy silica, bronze, stainless steel, natural pearl, boron nitride, silicon dioxide, copper flake, copper alloy flake, zinc flake, zinc alloy flake, zinc oxide, enamel, china clay, porcelain, gypsum, titanium silicate, and the like. Mica is desirable because of its high transparency, strong reflectance and strong chroma, primarily due to the presence of small, coated flakes. Glass flakes have the attributes of high transparency, very white bulk color and a sparkle effect in strong light.

Examples of useful spherical materials include glass, plastic, ceramic, metal, or an alloy and the spheres may be solid or hollow. Useful glass spheres are disclosed in U.S. Pat. No. 5,217,928, incorporated in its entirety herein by reference.

Useful cubical material includes glass cubes.

One useful metal oxide-coated glass platelets is described in commonly assigned U.S. Pat. No. 5,753,371, the disclosure of which is hereby incorporated by reference. That patent discloses the coating of C glass in preference to A or E glasses. A glass is a soda-lime glass, commonly used to make windows and contains more sodium than potassium and also contains calcium oxide. C glass, also known as chemical glass, is a form which is resistant to corrosion by acid and moisture. E or electrical glass is, as the name implies, designed for electronic applications and although it is very stable at high temperatures, it can be susceptible to chemical attack. See also commonly assigned U.S. Pat. No. 6,045,914. Engelhard FIREMIST® pearlescent pigment (calcium sodium borosilicate substrate with tin oxide and titanium dioxide) may be used in the present invention.

The metal oxide in most widespread use is titanium dioxide, followed by iron oxide. Other usable oxides include (but are not limited to) tin, chromium and zirconium oxides as well as mixtures and combinations of oxides. Other useful combinations of metal oxides include $SiO_2$ on calcium aluminum borosilicate and then $TiO_2$ thereon; substrate/$SiO_2$/$Fe_2O_3$; substrate/$TiO_2$/$SiO_2$; substrate/$TiO_2$/$SiO_2$/$TiO_2$; substrate/$TiO_2$/$SiO_2$/$Fe_2O_3$: substrate/$TiO_2$/$SiO_2$/$Cr_2O_3$; substrate/$Fe_2O_3$/$SiO_2$; substrate/$Fe_2O_3$/$SiO_2$/$Fe_2O_3$; substrate/$Fe_2O_3$/$SiO_2$/$TiO_2$; substrate/$Fe_2O_3$/$SiO_2$/$Cr_2O_3$; substrate/$Cr_2O_3$/$SiO_2$/$Cr_2O3$; and substrate/$Cr_2O_3$/$SiO_2$/$Fe_2O_3$. Other combinations of the above mentioned layers are obvious to one skilled in the art. $SnO_2$ may also be used on the calcium aluminum borosilicate.

An interlayer to enhance performance attributes may also be used. Useful interlayer materials include the hydroxides and oxides of Al, Ce, Cr, Fe, Mg, Si, Ti, and Zr. Essentially any organic or inorganic substance may be a useful interlayer for adhesion promotion, mechanical integrity, product enhancement, or other desirable attributes.

Most preferred are the well-known metal-oxide-coated mica effect pigments. The metal oxide-coated substrate nacreous pigments are well known and are exemplified by titanium dioxide- and/or iron oxide-coated mica. Such pigments are described, for example, in U.S. Pat. Nos. 3,437,513; 3,418,146; and 3,087,828 incorporated herein by reference in their entireties. A preferred nacreous pigment is titanium dioxide-coated mica. The mica flake substrates generally have a length of about 1 to about 75 microns, preferably about 5 to about 35 microns, and a thickness between about 0.3 and about 3 microns, but both larger and smaller dimensions can also be employed. Usually, the titanium dioxide or other metal oxide will be coated on the substrate surface to a thickness of about 20-350 nanometers or such that it is about 50 to 500 mg/m$^2$, depending on the specific surface area of the substrate in m$^2$/g. Depending on the thickness of the metal oxide coating, the pigments can exhibit interference or reflection colors of blue, green, yellow, red, etc.

The metal oxide-coated pigment can be optionally coated with a wide variety of inorganic and organic coloring agents or dyestuffs. Examples are described, for instance, in U.S. Pat. Nos. 4,084,983; 4,755,229; 4,968,351; and 6,436,538.

The metal oxide-coated pigment may, if desired, contain absorption pigments, which are water insoluble, transparent (i.e. substantially non-light scattering) and which cannot be formed in situ from a water soluble reactant(s) but which may be highly dispersed in water or water-alcohol containing anionic polymer. These include, for example, organic pigments in the following groups: azo compounds, anthraquinones, perinones, perylenes, pyrroles such as diketopyrrolo pyrroles, quinacridones, thioindigos, dioxazines and phthalocyanines and their metal complexes. The absorption pigments, depending on their color intensity, are used in a concentration range of about 0.01% to about 30% based on the weight of platy substrate, preferably 0.1% to 10%.

Colors may be adjusted if desired by mixing combination pigments. In general, it is preferred to mix pigments of the same or similar reflection color, since reflection colors mix additively and color intensity is reduced when very different reflection colors are mixed. The absorption pigment components mix subtractively, and the usual pigment blending procedures are followed.

Aluminum Pigment (b):

The aluminum flake pigments used in the present invention act like a non-leafing grade by distributing themselves throughout the final product. The particle size, i.e., the greatest dimension, of the pigments typically ranges in size from about 1 to about 200 µm. Preferably, the average particle size of the aluminum flake pigment is not greater than about 20 µm. Preferably, the aluminum flake pigments used in the present invention have a thickness of about 0.01 to about 0.05 um. Such pigments are often referred to as a vacuum metallized flakes or VMF type of aluminum pigments due to their manner of manufacture, namely, vacuum metallization or physical vapor deposition on a substrate. Conventional aluminum flake pigments typically have a thickness of about 0.1 micron to about 0.5 micron and thus, the present aluminum flake pigments are considerably thinner. Compared with conventional aluminum flake pigments, the present aluminum flake pigment has an extremely smooth surface and thus, a mirror-like appearance. One commercially available useful aluminum flake is STARBRITE® aluminum flake from Silberline.

The results achieved with the VMF-type aluminum flake pigments of the present invention are surprising and unexpected. Due to the fact that these VMF-type aluminum flake pigments are much thinner than the conventional aluminum flake pigments, there are more flakes per unit of weight. Using conventional aluminum flakes, the more flakes present, the greater the loss of color of the effect pigment as shown in Comparative B below. Since for any given weight of aluminum pigment, there are more VMF flakes than conventional flakes, it is expected that the decrease in the face color of the mica pigments should be achieved more quickly. That, however, is the opposite of what happens provided that the VMF-type aluminum pigment is present in an amount that does not exceed about 5% of the total weight of the blend of the VMF-type aluminum flake pigment and effect pigment. Preferably the aluminum pigment constitutes about 0.1 to about 5 weight percent of the total weight of the blend and more preferably about 0.25 to about 0.5 weight percent.

The aluminum flake pigment and effect pigments used in the present invention can be mixed in any convenient fashion. No special procedures are required. One useful method is disclosed in Silberline U.S. Pat. No. 4,725,317 incorporated herein by reference in its entirety.

The preparation process comprises forming a coherent paste comprising an organic binder medium, an organic liquid vehicle and the metal pigment, in powder or flake form, the paste being formed by mixing a first component comprising the organic binder medium and a second component comprising the metal pigment with either or both of the first and second components comprising organic liquid vehicle and the paste containing from 1 to 70% preferably from 3 to 45%, especially from 5 to 30%, of the organic binder medium based on the weight of the metal pigment, and removing substantially all of the organic liquid vehicle(s) from the coherent paste, optionally after sub-dividing the coherent paste into particles, such as pellets, tablets or granules, each containing a plurality of the metal pigment particles dispersed in a matrix of organic binder medium.

The resulting solid metal pigment composition comprises the metal pigment particles dispersed in a matrix of the organic binder material, the relative proportions of the binder material and metal in the solid product being substantially the same as in the coherent paste. The coherent paste preferably is sub-divided, as by pelletizing, granulating or tabletting for example, to assist removal of the organic liquid vehicle(s) and the solid metal pigment composition is then in a physical form which is easy to handle, non-explosive, and simple to use in a variety of applications. The organic liquid vehicle(s) may be removed from the coherent paste, for example, in a vacuum oven at elevated temperature.

Those binder materials that form a stable concentrated solution in the same organic liquids as are used for the preparation of metal flake, e.g. mineral spirits, may be used as this greatly simplifies the recovery of the organic liquid for re-use. In principle, however, any organic liquid or mixture of liquids that is chemically inert with respect to the metal powder and the binder material and which has a boiling point which is below the boiling point of any liquid binder used as such or formed by melting during removal of organic liquid vehicle may be employed as organic liquid vehicle.

Apparatus suitable for use in the preparation of these easily handled physical forms is well known to those skilled in the art. Pellets may be formed by forcing the precursor coherent paste through a number of suitably sized holes in a plate. The organic liquid vehicle is again removed such as by evaporation.

Utility:

The products of the present invention can be used in any application where pearlescent pigments have been used heretofore. Thus, the products of this invention have an unlimited use in all types of automotive and industrial paint applications, especially in the organic color coating and inks field where deep color intensity is required. For example, these pigments can be used in mass tone or as styling agents to spray paint all types of automotive and non-automotive vehicles. Similarly, they can be used on all clay/formica/wood/glass/metal/enamel/ceramic and non-porous or porous surfaces. The pigments can be used in powder coating compositions. They can be incorporated into plastic articles geared for the toy industry or the home. The present blends may also be incorporated into polymeric containers or packages such as personal care and cosmetics containers such as for skin care products such as facial mask, UV protective lotion, liquid soap, and antimicrobial product; hair care products such as shampoo, conditioner, hair spray or fixative, and hair colorant; makeup products such as nail polish, mascara, eye shadow, and perfume; shaving cream, deodorant, and baby oil. These pigments can be impregnated into fibers to impart new and esthetic coloring to clothes and carpeting. They can be used to improve the look of shoes, rubber and vinyl/marble flooring, vinyl siding, and all other vinyl products. In addition, these colors can be used in all types of modeling hobbies.

The above-mentioned compositions in which the compositions of this invention are useful are well known to those of ordinary skill in the art. Examples include printing inks, nail enamels, lacquers, thermoplastic and thermosetting materials, natural resins and synthetic resins. Some non-limiting examples include polystyrene and its mixed polymers, polyolefins, in particular, polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

For a well-rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282-591; with regard to paints: C. H. Hare, Protective Coatings, Technology Publishing Co., Pittsburgh (1994), particularly pages 63-288. The foregoing references are hereby incorporated by reference herein for their teachings of ink, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an automotive paint formulation along with other pigments that may include titanium dioxide, acrylic lattices, coalescing agents, water or solvents. The pigment may also be used, for example, at a level of 20 to 30% in a plastic color concentrate in polyethylene.

In the cosmetic and personal care field, these pigments can be used in the eye area and in all external and rinse-off applications. Thus, they can be used in hair sprays, face powder, leg-makeup, insect repellent lotion, mascara cake/cream, nail enamel, nail enamel remover, perfume lotion, and shampoos of all types (gel or liquid). In addition, they can be used in shaving cream (concentrate for aerosol, brushless, lathering), skin glosser stick, skin makeup, hair groom, eye shadow (liquid, pomade, powder, stick, pressed or cream), eye liner, cologne stick, cologne, cologne emollient, bubble bath, body lotion (moisturizing, cleansing, analgesic, astringent), after shave lotion, after bath milk and sunscreen lotion.

Analytical Methods:

Dry film thickness at hide is determined by preparing the samples according to ASTM D6762-O2a Standard Test Method for Determining the Hiding Power of Paint by Visual Evaluation of Spray Applied Coatings and then testing the prepared samples according to ASTM D1400-00 Standard Test Method for Non-Destructive Measurement of Dry Film Thickness of Non-Conductive Coatings Applied to Non-Ferrous Metal Base.

The presence of aluminum metal pigment may be determined by optical microscopic analysis.

The presence of a blend may be determined by optical microscopic analysis.

In order to further illustrate the present invention, a number of non-limiting examples are set forth below. In these, as well as throughout this specification and claims, all parts and percentages are by weight and all temperatures are in degrees centigrade, unless otherwise indicated.

Faced with the automotive industry need for a new hiding power composition, we proceeded as follows.

Comparative A

TUFFLAKE® 3650 pigment is an aluminum flake that is supplied by Silberline, has a thickness of one micron, is made by ball milling, and as a result, has a rough surface finish and dull appearance. LUMINA® green pigment is an effect pigment that is supplied by Engelhard Corporation and comprises about 66 weight percent $TiO_2$ and 31 weight percent mica. Blends of TUFFLAKE® 3650 pigment and LUMINA® green pigment were made at ratios of 99.75% to 0.25%; 99.5% to 0.5%; 99% to 1%; 97.5% to 2.5%; and 95% to 5%. The hiding power of these blends and 100% LUMINA® green pigment was determined and is set forth in the following Table and FIG. 1.

Comparative B

SPARKLE SILVER® pigment is an aluminum flake that is supplied by Silberline, has a thickness of 0.1 micron, and has a polished surface finish and brighter appearance. Blends of SPARKLE SILVER® pigment and LUMINA® green pigment as described in Comparative A above were made at ratios of 99.75% to 0.25%; 99.5% to 0.5%; 99% to 1%; 97.5% to 2.5%; and 95% to 5%. The hiding power of these blends and 100% LUMINA® green pigment was determined and is set forth in the following Table and FIG. 1.

INVENTIVE EXAMPLE 1

We then stumbled upon the following unexpected result. STARBRITE® pigment is an aluminum flake that is supplied by Silberline, is made by vacuum metallization, has a thickness of from about 0.01 micron to about 0.5 micron, and has a smooth surface finish and mirror-like appearance. Blends of STARBRITE® pigment and LUMINA® green pigment as described in Comparative A above were made at ratios of 99.75% to 0.25%; 99.5% to 0.5%; 99% to 1%; 97.5% to 2.5%; and 95% to 5%. The hiding power of these blends and 100% LUMINA® green pigment was determined and is set forth in the following Table and FIG. 1. These blends yielded desirable dry film thickness at hide. Color data for these ratios are in FIGS. 2 and 3.

Since VMF-type aluminum flakes are thinner than conventional aluminum flakes, one would have expected that more flakes per gram for VMF would result in more opacifying power while decreasing the face color of the effect pigments. Unexpectedly, we observed the opposite.

At the same dry film thickness at hide of about 1.6 mils, Inventive Example 1 (ratio of effect pigment to aluminum of 99.5 to 0.5) had unexpectedly better brightness, color intensity, and color travel than Comparative B (ratio of effect pigment to aluminum of 95 to 5) as shown in FIGS. 4, 5, and 6. Thus, since Comparative B required more than 10× (ten times) the amount of conventional aluminum flake to achieve the same opacity as the present invention, the improved hiding power of Inventive Example 1 while maintaining the face color of the effect pigment was unexpected.

| Ratio of Effect Pigment (a) to Aluminum Pigment (b) | 100:0 | 99.75:0.25 | 99.5:0.5 | 99:1 | 97.2:2.5 | 95:5 |
| --- | --- | --- | --- | --- | --- | --- |
| Comparative A Hiding Power (dry film thickness at hide (mils)) | 10.4 | 6.8 | 4.4 | 4.2 | 3.5 | 2.9 |
| Comparative B Hiding Power (dry film thickness at hide (mils)) | 10.4 | 4.3 | 3.5 | 3.0 | 2.4 | 1.6 |
| Inventive Example 1 Hiding Power (dry film thickness at hide (mils)) | 10.4 | 2.1 | 1.6 | 1.1 | 0.6 | 0.2 |

INVENTIVE EXAMPLE 2

The metal oxide-coated material employed in Inventive Example 1 is replaced with the same effect pigment further treated with a weatherability treatment in accordance with commonly assigned U.S. Pat. No. 5,759,255 incorporated herein by reference.

INVENTIVE EXAMPLE 3

The blend of Inventive Example 1 is incorporated into a powder eye shadow of the following formulation:

| Ingredients | wt parts |
| --- | --- |
| Talc | 19.4 |
| Mearlmica SVA | 15.0 |
| Magnesium Myristate | 5.0 |
| Silica | 2.0 |
| Preservatives | 0.5 |
| Product of example 1 | 50.0 |
| Octyl Palmitate | 7.0 |
| Isostearyl Neopentanoate | 1.0 |
| BHT | 0.1 |

INVENTIVE EXAMPLE 4

The blend of Inventive Example 1 is incorporated into a nail enamel of the following formulation:

| Ingredients | wt parts |
| --- | --- |
| Suspending lacquer SLF-2 | 82.0 |
| Product of Inventive Example 1 | 3.0 |
| Lacquer 127P | 10.5 |
| Polynex B-75 | 2.5 |
| Ethyl Acetate | 2.0 |

INVENTIVE EXAMPLE 5

A charge of 1.0 wt % of the product of Inventive Example 1 is added to polypropylene and dispersed therein and injected molded into a flat plaque.

INVENTIVE EXAMPLE 6

The blend of Inventive Example 1 is incorporated into a water based paint composition at a pigment/paint ratio of 0.13. The paint is sprayed onto a primed steel panel to about 15-20 microns. This base coat is allowed to flash for at least 10 minutes, and then baked at 85° C. for 6.5 minutes before cooling. A clearcoat is then applied to a thickness of 40-45 microns and the resulting panel is baked at 140° C. for 30 minutes.

INVENTIVE EXAMPLE 7

The effect material blend of Inventive Example 1 is sprayed at 3.5 wt % loading in a polyester TGIC power coating using a corona gun over a RAL 9005 black powder sprayed base.

INVENTIVE EXAMPLE 8

The pigment of this invention can be formulated into a powder eye shadow by thoroughly blending and dispersing the following materials:

| Ingredients | wt parts |
| --- | --- |
| MEARLTALC TCA ® (Talc) | 18 |
| MEARLMICA ® SVA (Mica) | 20 |
| Magnesium Myristate | 5 |
| Silica | 2 |
| CLOISONNÉ ® Red 424C (red TiO$_2$-coated mica) | 20 |
| CLOISONNÉ ® Violet 525C (violet TiO$_2$-coated mica) | 13 |
| CLOISONNÉ ® Nu-Antique Blue 626CB (TiO$_2$-coated mica/iron oxide-coated mica) | 2 |
| CLOISONNÉ ® Cerise Flambé 550Z (iron oxide-coated mica) | 2 |
| Preservatives & Antioxidant | q.s. |

Then 7 parts of octyl palmitate and 1 part of isostearyl neopentanoate are heated and mixed until uniform, at which time the resulting mixture is sprayed into the dispersion and the blending continued. The blended material is pulverized and then 5 parts of Cloisonne Red 424C and 5 parts of the pigment blend of this invention added and mixed until a uniform powder eye shadow is obtained.

INVENTIVE EXAMPLE 9

The pigment blend can be formulated into a lipstick by placing the following amounts of the listed ingredients into a heated vessel and raising the temperature to 85±3° C.:

| Ingredients | wt parts |
| --- | --- |
| Candelilla Wax | 2.75 |
| Carnauba Wax | 1.25 |
| Beeswax | 1.00 |
| Ceresine Wax | 5.90 |
| Ozokerite Wax | 6.75 |
| Microcrystalline Wax | 1.40 |
| Oleyl Alcohol | 3.00 |
| Isostearyl Palmitate | 7.50 |
| Isostearyl Isostearate | 5.00 |
| Caprylic/Capric Triglyceride | 5.00 |
| Bis-Diglycerylpolyalcohol Adipate | 2.00 |
| Acetylated Lanolin Alcohol | 2.50 |
| Sorbitan Tristearate | 2.00 |
| Aloe Vera | 1.00 |
| Castor Oil | 37.50 |
| Red 6 Lake | 0.25 |
| Tocopheryl Acetate | 0.20 |
| Phenoxyethanol, Isopropylparaben, and butylparaben | 1.00 |
| Antioxidant | q.s. |

A mixture of 13 parts of the pigment blend of Inventive Example 1 and 1 part of kaolin are added and mixed until all of the pigment is well dispersed. Fragrance is added as desired and mixed with stirring. The resulting mixture is poured into molds at 75±5° C. allowed to cool and flamed into lipsticks.

Various changes and modifications can be made in the process and products of the present invention without departing from the spirit and scope thereof. The embodiments described and illustrated herein were for the purpose of further illustrating the invention but were not intended to limit it.

What is claimed is:

1. Blend comprising:
   (a) at least one effect pigment; and
   (b) about 0.01 to about 5 weight percent based on total weight of said blend of an aluminum metal pigment having thickness of less than 0.1 micron.

2. The blend of claim 1 wherein said effect pigment (a) comprises mica.

3. The blend of claim 2 wherein said effect pigment (a) is metal oxide-coated mica.

4. The blend of claim 3 wherein said effect pigment (a) is titanium dioxide-coated mica.

5. The blend of claim 3 wherein said effect pigment (a) is iron dioxide-coated mica.

6. The blend of claim 1 wherein at least two of said effect pigments are present.

7. The blend of claim 1 wherein said aluminum metal pigment (b) is present at about 0.25 to about 0.5 weight percent.

8. The blend of claim 1 wherein said aluminum metal pigment (b) is made by vacuum metallization.

9. The blend of claim 1 wherein said aluminum metal pigment (b) is made by vapor deposition.

10. The blend of claim 1 wherein said aluminum metal pigment (b) has a thickness of less than or equal to 0.05 micron.

11. The blend of claim 1 wherein said aluminum metal pigment (b) has a thickness of about 0.01 to about 0.05.

12. The blend of claim 1 wherein said aluminum metal pigment (b) has a smooth surface finish.

13. The blend of claim 1 wherein said effect pigment (a) has a platy substrate.

14. The blend of claim 13 wherein said platy substrate is selected from the group consisting of platy aluminum oxide, platy glass, platy titanium dioxide, mica, bismuth oxychloride, platy iron oxide, platy graphite, platy silica, bronze, stainless steel, natural pearl, boron nitride, silicon dioxide, copper flake, copper alloy flake, zinc flake, zinc alloy flake, zinc oxide, enamel, china clay, porcelain, gypsum, and titanium sulfate.

15. In a coating, ink, paint, or plastic composition containing a pigment, the improvement which comprises the blend of claim 1.

16. The composition of claim 15 which is an automotive topcoat composition.

17. A method of improving hiding power comprising the step of:

applying to a surface the blend of claim 1 so as to hide the surface.

* * * * *